United States Patent
Gopalkrishnan et al.

(10) Patent No.: US 7,680,918 B2
(45) Date of Patent: Mar. 16, 2010

(54) MONITORING AND MANAGEMENT OF ASSETS, APPLICATIONS, AND SERVICES USING AGGREGATED EVENT AND PERFORMANCE DATA THEREOF

(75) Inventors: Hari Gopalkrishnan, Plainsboro, NJ (US); Benjamin Wu, Monmouth Junction, NJ (US); Bridget Elizabeth O'Connor, South Amboy, NJ (US)

(73) Assignee: Barclays Capital Inc., New York, NY (US)

( * ) Notice: Subject to any disclaimer, the term of this patent is extended or adjusted under 35 U.S.C. 154(b) by 50 days.

(21) Appl. No.: 12/007,355

(22) Filed: Jan. 9, 2008

(65) Prior Publication Data
US 2008/0114878 A1 May 15, 2008

Related U.S. Application Data

(63) Continuation of application No. 10/924,572, filed on Aug. 24, 2004, now Pat. No. 7,353,265.

(60) Provisional application No. 60/576,200, filed on Jun. 2, 2004.

(51) Int. Cl.
*G06F 15/173* (2006.01)
(52) U.S. Cl. ................................ 709/223; 709/224
(58) Field of Classification Search ......... 709/223–225; 714/39
See application file for complete search history.

(56) References Cited

U.S. PATENT DOCUMENTS

| | | | |
|---|---|---|---|
| 7,353,265 B2 * | 4/2008 | Gopalkrishnan et al. | 709/223 |
| 2001/0049615 A1 * | 12/2001 | Wong et al. | 705/8 |
| 2001/0051907 A1 | 12/2001 | Kumar et al. | |
| 2002/0069081 A1 | 6/2002 | Ingram et al. | |
| 2002/0095651 A1 | 7/2002 | Kumar et al. | |
| 2002/0161901 A1 | 10/2002 | Weissman | |
| 2003/0140120 A1 | 7/2003 | Hartman | |
| 2003/0144983 A1 | 7/2003 | Bigus et al. | |
| 2003/0191832 A1 | 10/2003 | Satyavolu et al. | |
| 2004/0088386 A1 | 5/2004 | Aggarwal | |
| 2004/0088403 A1 | 5/2004 | Aggarwal | |
| 2004/0098391 A1 | 5/2004 | Robertson et al. | |

\* cited by examiner

*Primary Examiner*—Krisna Lim
(74) *Attorney, Agent, or Firm*—Morgan, Lewis & Bockius LLP

(57) ABSTRACT

A method and system for monitoring and managing applications and services. A repository comprising information identifying a plurality of assets and one or more relationships among the assets is maintained. One or more assets used to support an application are identified, along with one or more applications that are included in a service. Event and performance data are collected by a plurality of tools that perform monitoring and/or managing of the identified assets, the application, and/or the service. The gathered event and performance data is aggregated. The user is provided with a portal to access the aggregated event and performance data. Through this portal, the user can determine an impact of an event or a performance issue on the application or service based on the aggregated event or performance data and the relationships among the assets.

9 Claims, 9 Drawing Sheets

LAS Appinstance Details

Hierarchy
Parent Application
LAS    Details

App-Instances:
- BCP    Details | Dependencies
- LAS    Details | Dependencies
- LAS DEV    Details | Dependencies
- LAS QA    Details | Dependencies
- LAS Stage    Details | Dependencies

LAS Metrics

Dependency Tree

- Database Servers
  - LASPROD
  - NYLLPROD
- NT Servers
  - njgaeovp001
  - njisgnt01
  - njisgnt18
  - njisgnt28
  - njisgnt31
  - nygaeovp001
  - nyisgnt11
  - nyisgnt12
  - nyisgnt27
- Solaris Servers

HPOV Console Monitor

| Severity | Time | Node | App | Message |
|---|---|---|---|---|
| Major | 9:10:42 05/19/04 | LAS | OVIS | HTTP response time for ws/LAS/HPOVConsole_iframe?old=ins_L AS&type=A&subScribetag=target&alertStatus=N is 20.124 second s (should be < 10.000 or between (0.000 and 9.784)) |
| Warning | 8:49:36 05/19/04 | njecompr.. | Weblogic Performances | WLSSPI-0240.1: Ave. execution time for a servlet (105137.00m s) too high (>=30000.00ms) |
| Warning | 8:45:09 05/19/04 | njecompr.. | Weblogic Performances | WLSSPI-0240.1: Ave. execution time for a servlet (90365.00m s) too high (>=30000.00ms) |
| Warning | 8:44:29 05/19/04 | njecompr.. | Weblogic Performances | WLSSPI-0240.1: Ave. execution time for a servlet (240685.00m s) too high (>=30000.00ms) |
| Warning | 7:50:46 05/19/04 | njecompr.. | Weblogic Performances | WLSSPI-0240.1: Ave. execution time for a servlet (31628.00ms) too high (>=30000.00ms) |
| Minor | 7:50:33 05/19/04 | LAS | OVIS | HTTP response time for ws/LAS/DesignProcessServlet?old=app _LAS is 10.890 seconds (should be < 7.000 or between (0.000 and 9.862)) |
| Minor | 7:50:33 05/19/04 | LAS | OVIS | HTTP response time for ws/LAS/HPOVConsole_iframe?old=ins_L AS&type=A&subScribetag=target&alertStatus=N is 13.405 second s (should be < 10.000 or between (0.000 and 9.886)) |
|  |  |  | Alert Count | 95 | 32 | 0 | 0 |

Current Incidents (Open & Resolved)

| Title | Affected System | Status | Priority | Alert Type | Date/Time |
|---|---|---|---|---|---|
| LASER Alerts Delayed | LASERS Prod | Resolved | Medium | Outage | 11-May-2004 09:34 EDT |

FIG. 3

MONITORING AND MANAGEMENT OF ASSETS, APPLICATIONS, AND SERVICES USING AGGREGATED EVENT AND PERFORMANCE DATA THEREOF

CROSS REFERENCE TO RELATED APPLICATIONS

This application is a continuation application of U.S. patent application Ser. No. 10/924,572, filed Aug. 24, 2004, which claims the benefit of U.S. Provisional Patent Application No. 60/576,200, filed on Jun. 2, 2004, which are hereby incorporated by reference.

FIELD OF THE INVENTION

The present invention relates to monitoring and managing assets, applications and services.

BACKGROUND OF THE INVENTION

Prior to the present invention, if an application that involved several or many infrastructure components (e.g., databases, servers etc.) was experiencing a performance problem, the persons in charge of each infrastructure component would need to be consulted in an attempt to identify the source of the problem. Each such person would be required to review his or her system to determine if it were the source of the problem. This process is very inefficient and a great deal of time was consumed attempting to identify the source of the problem. This highly manual process involved collecting data across many infrastructure silos, aggregating it and correlating it in such a way to identify the issue. The prior art processes allowed for minimum operational transparency.

In addition, there are many tools that must be consulted to collect the data required to identify the problem. The sheer number of tools available makes it difficult to know which tool to use. In addition, each of the tools involves different display screens with different layouts and usage directions. No unifying concept exists in the prior art that ties all the tools together.

Operators assigned to these tools would receive an alert on his/her console and follow standard operating procedures in an attempt to resolve the problem. However, persons other than operators, such as application developers and key stakeholders in the application, have an interest being informed of events and alerts. Rolling out consoles to all application developers and key stakeholders presents a challenge, both in terms of the number of consoles that would be required and training involved for each console.

The present invention resolves the problems left unaddressed by prior art systems and methods.

SUMMARY OF THE INVENTION

The present invention is directed to a system and method for monitoring and managing applications and services. A repository comprising information identifying a plurality of assets and one or more relationships among the assets is maintained. One or more assets used to support an application are identified, along with one or more applications that are included in a service. Event and performance data is collected by a plurality of tools that perform monitoring and/or managing of the identified assets, the application, and/or the service. The event and performance data is aggregated. The user is provided with a portal to access the aggregated event and performance data. Through this portal, the user can determine an impact of an event or a performance issue on the application or service based on the aggregated event or performance data and the relationships among the assets.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and, together with the description, serve to explain the principles of the invention.

In the drawings:

FIGS. 2 through 7 illustrate exemplary user interface screens that may be used in accordance with the present invention;

DETAILED DESCRIPTION OF THE PREFERRED EMBODIMENTS

The present invention provides a tool that allows users to monitor and manage assets, such as servers (e.g., web servers, application servers), people, routers, databases, and other applications, that are used to support applications, as well as the applications themselves and services comprised of the applications. The invention provides all interested parties, including operators, application owners and key stakeholders, transparency into applications. Information regarding an application necessary to support best practices is aggregated from a variety of sources and delivered to the user via a single user interface. The invention allows for increased business continuity planning by allowing application owners and stakeholders to see what servers, databases and other infrastructure components are in use, determine which have manual or automatic fail overs and identify the dependencies of applications and services.

In order to use the inventive portal, application owners must model their applications by identifying the owners and assigning dependencies (such as servers, databases, web servers, application servers, etc.) to their applications. This information is stored in a repository, which can then be searched for information on a particular asset. Users can get a fuller view of the details associated with the application. By drilling down, users can obtain more detailed information, such as alerts and notifications about the performance of the application. In addition, users are able to monitor, in real-time, network activity and database activity, as well as view incident reports.

Figure 1:
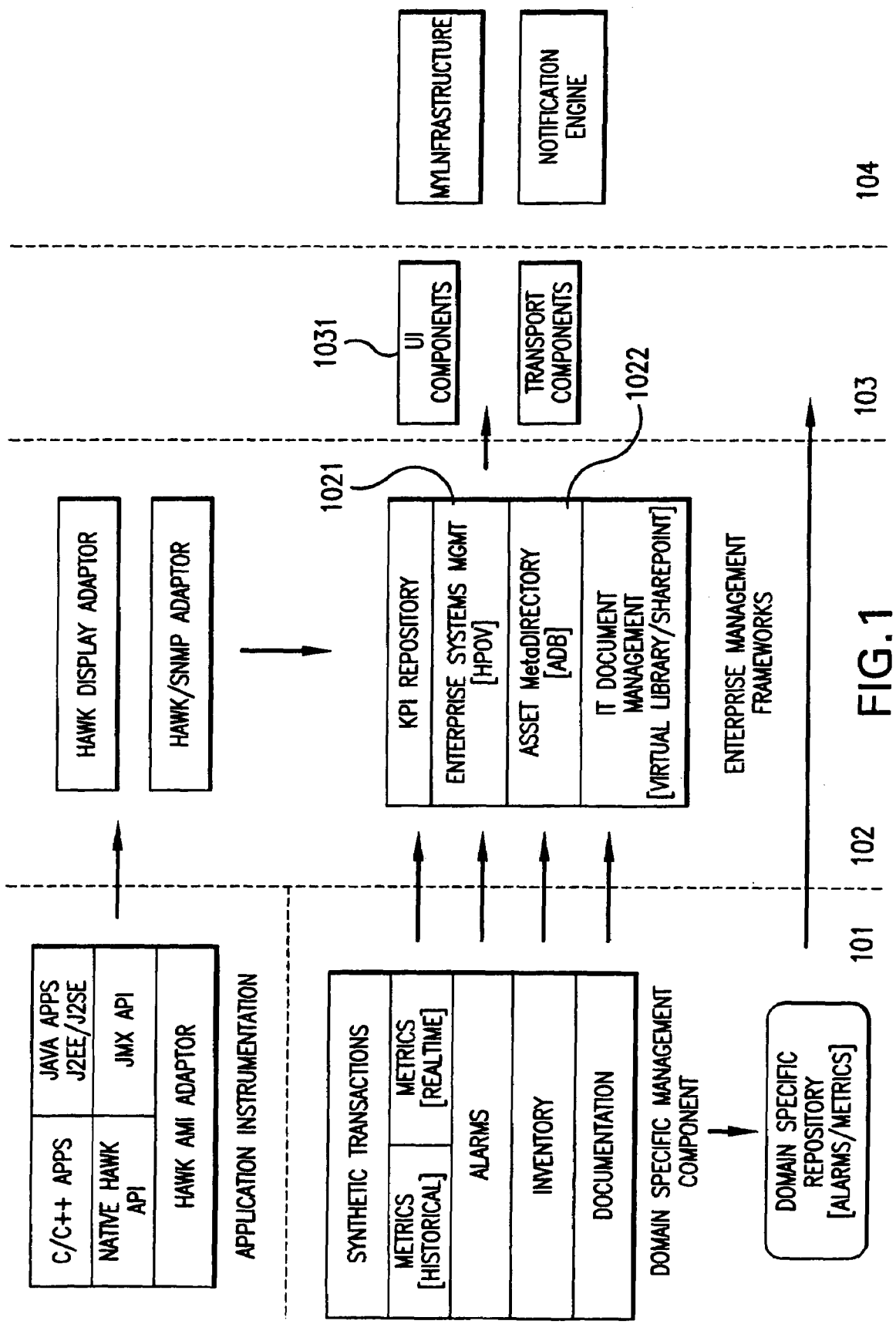
FIG. 1 illustrates an exemplary tiered, integrated architecture of the present invention.

With reference to FIG. 1, an exemplary tiered, integrated architecture of the present invention is illustrated. Tier 101 represents multiple silos for collecting data ultimately used to diagnose a problem occurring in an application. In tier 101, the application instrumentation and domain specific management components are shown. Application instrumentation allows developers to place logic in the code to provide business specific metrics on how applications are performing and/or functioning. Domain specific management components include items such as database monitors, application server monitors, and web server monitors, by way of example, that are used to collect data. The following provides some examples of data collection tools: HP OVIS; Sitescope; HP Service Reporter; SAN Manager; Best1; Hawk; Sentinel; Iwatch; AdventNet; HP OV Performance Manager; HP SPI and DBAWeb. These tools are exemplary only; virtually hundreds of tools exist, and are being developed, that can be used in connection with the present invention.

Data collected in tier 101 is then pulled into tier 102, using an enterprise system management tool 1021 that provides the framework for reporting events, and aggregated. The application instrumentation will need to be pulled in off the adapter (e.g., Hawk Display Adapter and Hawk/SNMP Adapter shown), but domain specific management components can be pulled directly from the user interfaces of the components. A user can make a request directly to one of the components and obtain data without need for configuration information. In a preferred embodiment, Hewlett Packard Open View ("HPOV") is used, although other similar tools can be used within the scope of the present invention. An asset repository 1022 includes meta data records for the infrastructure components and applications monitored by the tools in tier 101, including information regarding relationships among and between the components and the applications. This allows for viewing and modeling of the dependencies between infrastructure components and applications, as well as their interaction points. Thus, if a problem were to arise, the impact of the problem could be determined easily.

The aggregated data is then transmitted through the user interface and transport components of tier 103, to the delivery platform of tier 104, where the data is presented to the user. User interface components 1031 of tier 103 allow for aggregating data in different formats and from different sources, normalizing the data, and rendering it in a generic fashion to the user without having to build an interface for each of the domain specific management components.

The ability to aggregate data collected from many different silos, and model dependency viewers, allows for proactive solutions to problems arising in applications. Thus, as is discussed in more detail below with reference to FIGS. 2 through 7, the present invention provides a unified portal for infrastructure transparency; an integration point for application modeling; integration with incident and change management facilities; advanced performance and availability management tools; and key performance indicators.

An exemplary user interface of the delivery platform of tier 104 is described with reference to FIGS. 2 through 7.

Figure 2:
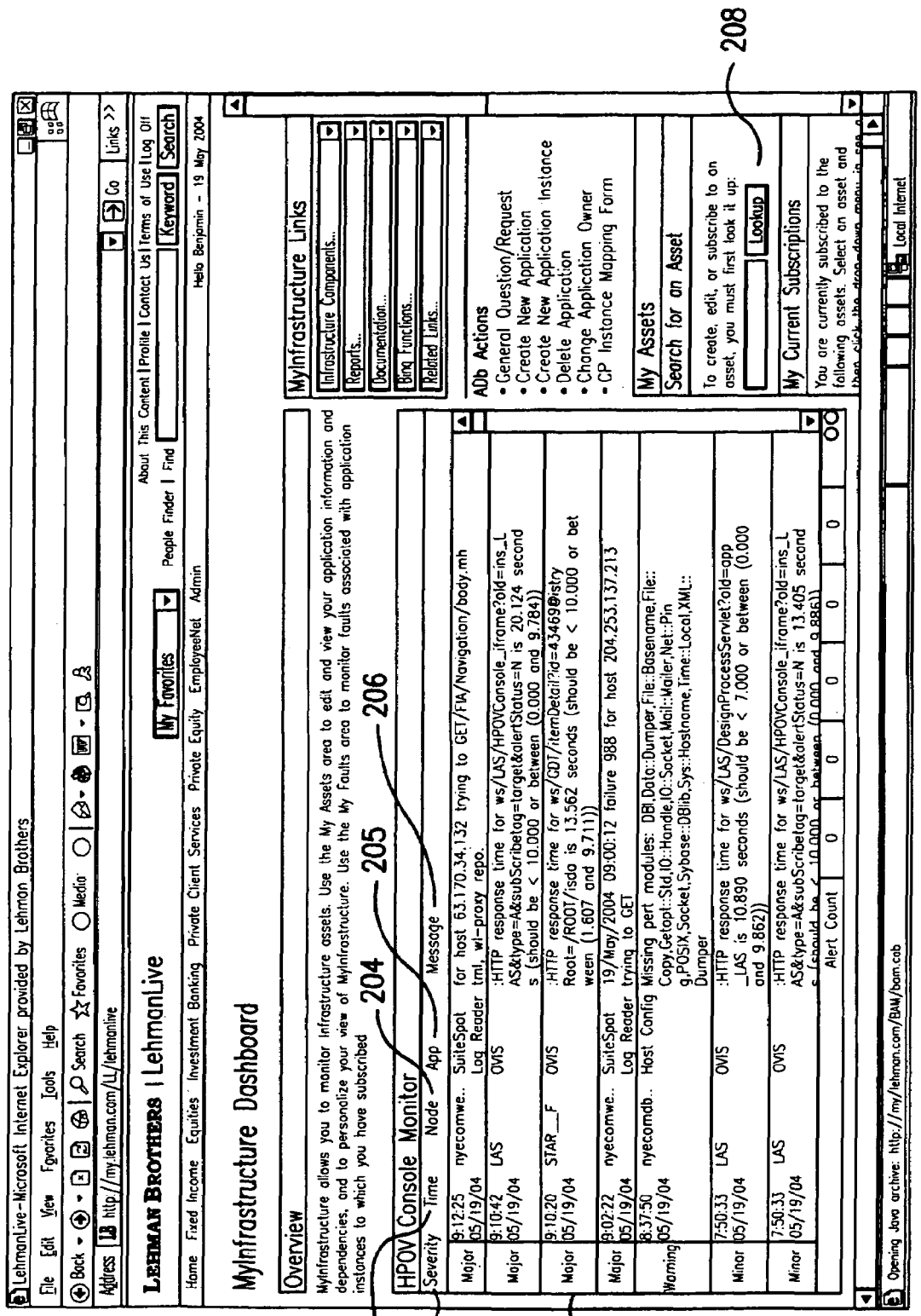

FIG. 2 provides an example of the home screen displayed to the user allowing for the monitoring of infrastructure assets. The console manager area 201 displays, in real time, the events that are occurring on various infrastructure components and in applications. The console manager area 201 indicates the severity of the event 202 (e.g., major, medium, minor, warning), which is color-coded in the preferred embodiment; the time and date the event occurred 203; the infrastructure component or application on which the event occurred 204; the tool that captured the data relating to the event 205; and a message describing the event 206.

The "My Assets" area 208 allows the user to edit and view his application information and dependencies, and to personalize his view. In a preferred embodiment, the view shown is user-sensitive, meaning that information relating to applications that the user is interested in and entitled to learn about are shown. In this way, the invention uses the concepts of entitlement, authorization and authentication and is implemented using profile information for each user stored in asset repository 1022.

A color-coded alert count bar 207 informs the user of the number of alerts in each category of severity.

Clicking on an entry in console manager area 201 will allow the user to view more details regarding the event. With reference to FIG. 3, additional details are provided regarding the second entry of console manager area 201, by way of illustration. Hierarchy area 301 lists the parent application and application instances. Metrics area 302 identifies, in list form, the infrastructure components on which the application depends. Console monitor area 303 is similar to console manager area 201 of FIG. 1, except that it lists the events that are specific to the application that is the subject of the screen. Also included is a current incidents area 304, which lists in summary fashion the events occurring on the application, the system effected, the status of the event, the priority and type of event, and the date and time of the event.

Figure 4:
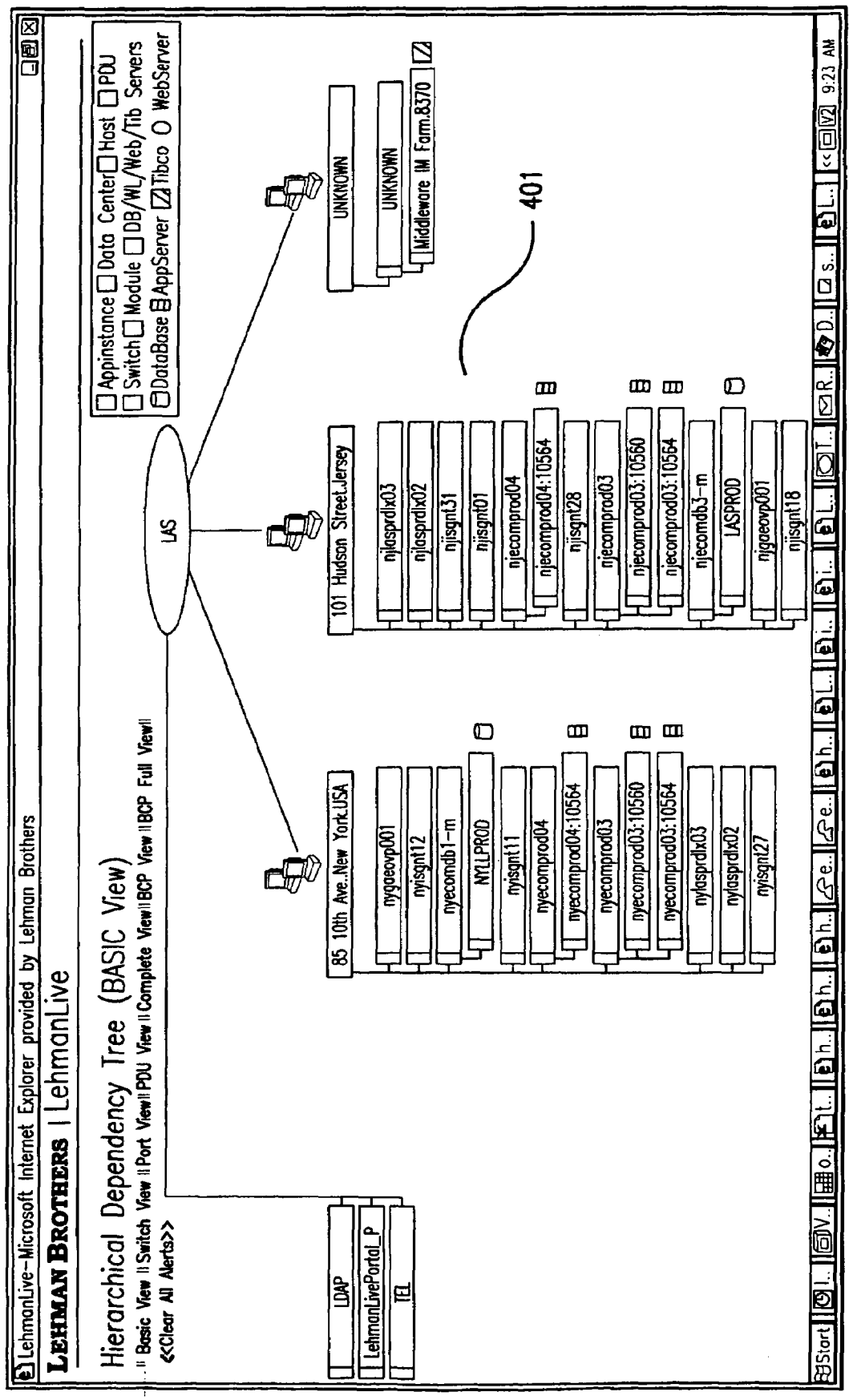

Using dependency tree button 305 in metrics area 302, a dependency tree 401, shown in FIG. 4, is displayed to the user. Dependency tree 401 provides a graphical view of infrastructure components on which the application depends, how these infrastructure components depend on each other, and how they are connected. In the preferred embodiment, the components of the dependency tree 401 are color-coded (using the same color coding used for the events listing of FIGS. 2 and 3 and the alert count bar 207 of FIG. 2), which indicates to the user, in real time, the status of the infrastructure components. Thus, for example, if an infrastructure component is displayed in red, the user can double click on it to view the last alert, its level and whether it has been addressed.

Figure 5:
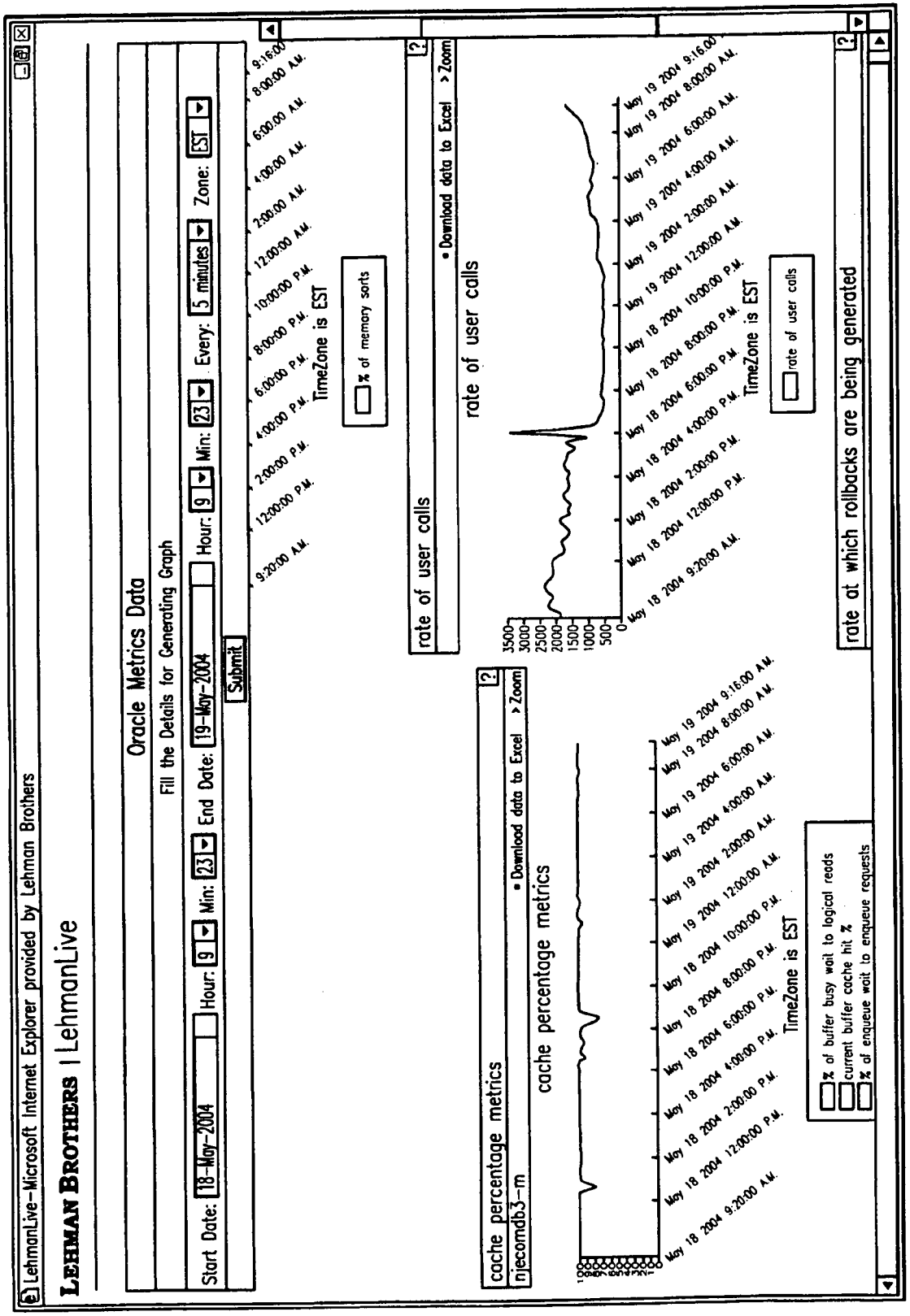
Figure 6:
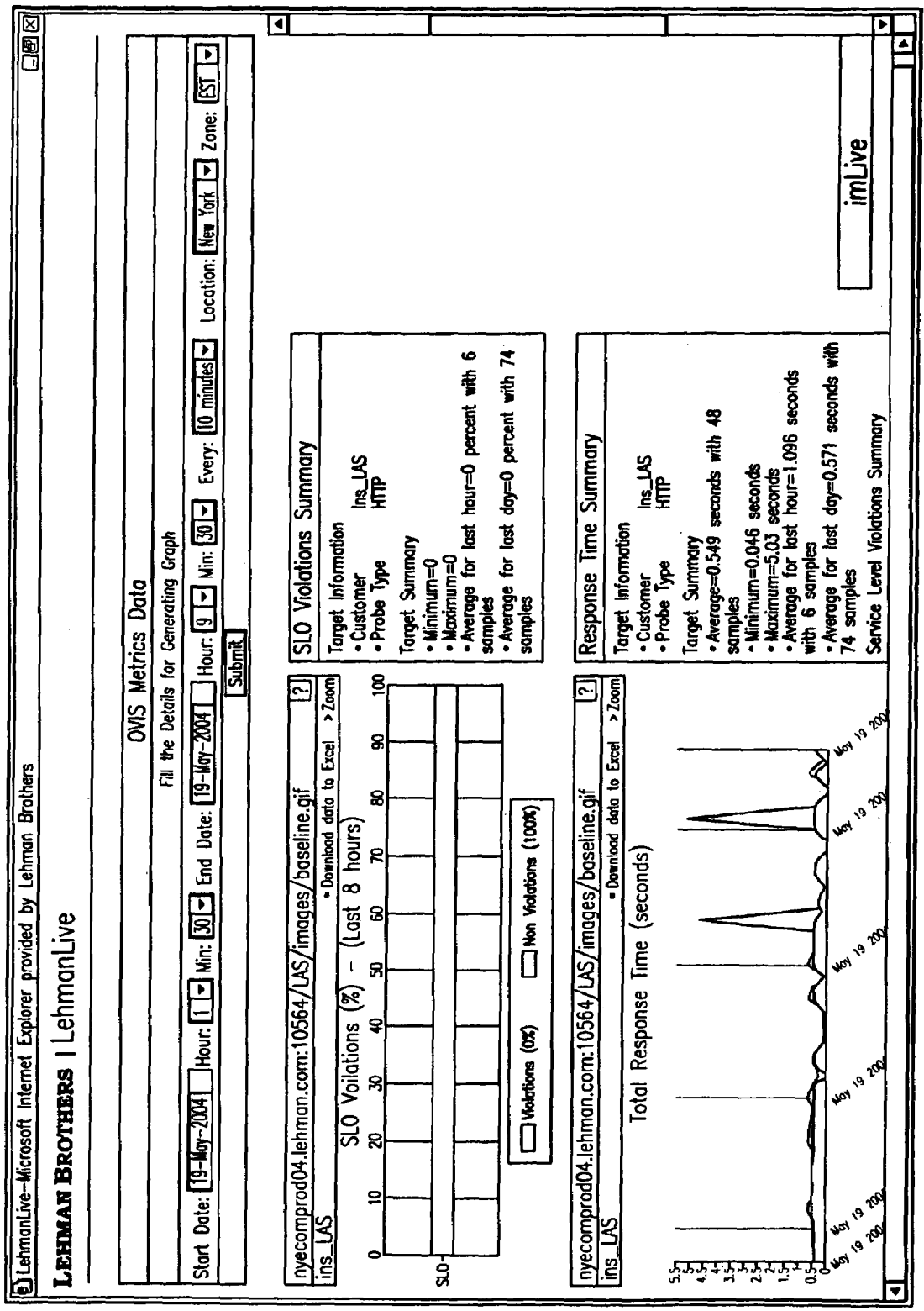

Still further detail of the assets can be accessed using the present invention. With reference to FIGS. 5 and 6, detailed performance data for a database and server, respectively, is shown. A user may navigate to these screens using metrics area 302.

Figure 7:
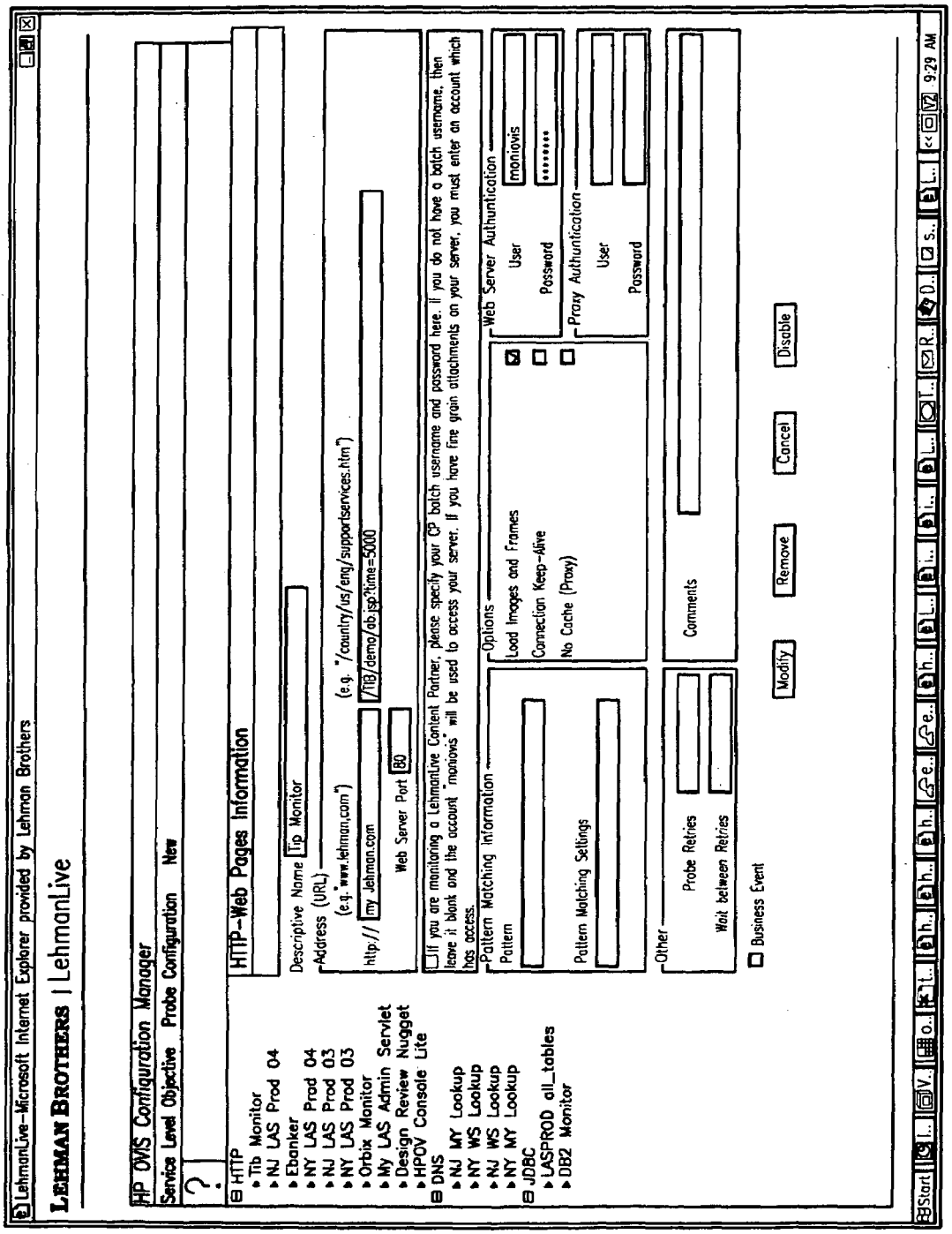

With reference to FIG. 7, OVIS configurations screens are provided, illustrating an example of how an application may be managed in accordance with the present invention. The screen shown in FIG. 7 allows a user to configure a synthetic transaction which is ultimately leveraging a third-party tool (i.e., HP OVIS) to monitor performance of the application. A user may navigate to this screen using metrics area 302 of FIG. 3. Only owners of an application are entitled to configure a synthetic transaction. If a user does not have the right, the edit icon will not be presented to the user.

Depicting the infrastructure and alerts in this manner provides many advantages. The user can identify problems quickly and determine the impact of the problem. Not only is the invention useful for day-to-day operational aspects of a system, but it can also be used to determine, e.g., whether a company is fully leveraging its infrastructure and how much infrastructure to plan for in the future.

Figure 8:
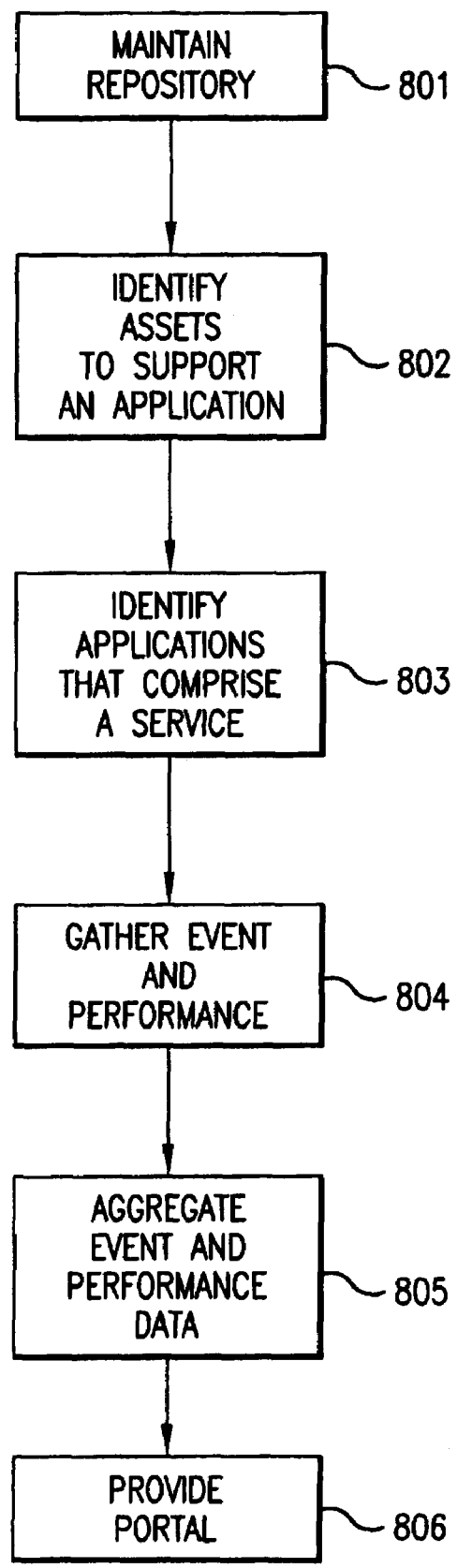
FIG. 8 is a flow chart illustrating a method of the present invention.

With reference to FIG. 8, a flow chart illustrating a preferred embodiment of the methods of the present invention is shown. In step 801, a repository comprising information identifying assets and relationships among the assets is maintained. In step 802, one or more assets used to support an application are identified. In step 803, one or more applications that are included in a service are identified. In step 804, event and performance data are collected by a plurality of tools that monitor and/or manage (i) the identified assets, (ii) the application, and/or (iii) the service.

In step 805, the collected event and performance data is aggregated. This is accomplished via an adapter approach where the enterprise management frameworks of the middle tier 102 (of FIG. 1) interact with the domain specific management components of tier 101. For certain products, web services are provided that wrap the data retrieval of each product.

Then, a generic tier is built that can retrieve data from any web service source, aggregate the data and present it in a manner that is relevant to the user.

In step 806, a portal is provided to a user which allows the user to access the aggregated event and performance data, thereby allowing the user to determine an impact of an event or a performance issue on the application or service based on the aggregated event or performance data and the relationships among the assets.

Figure 9:
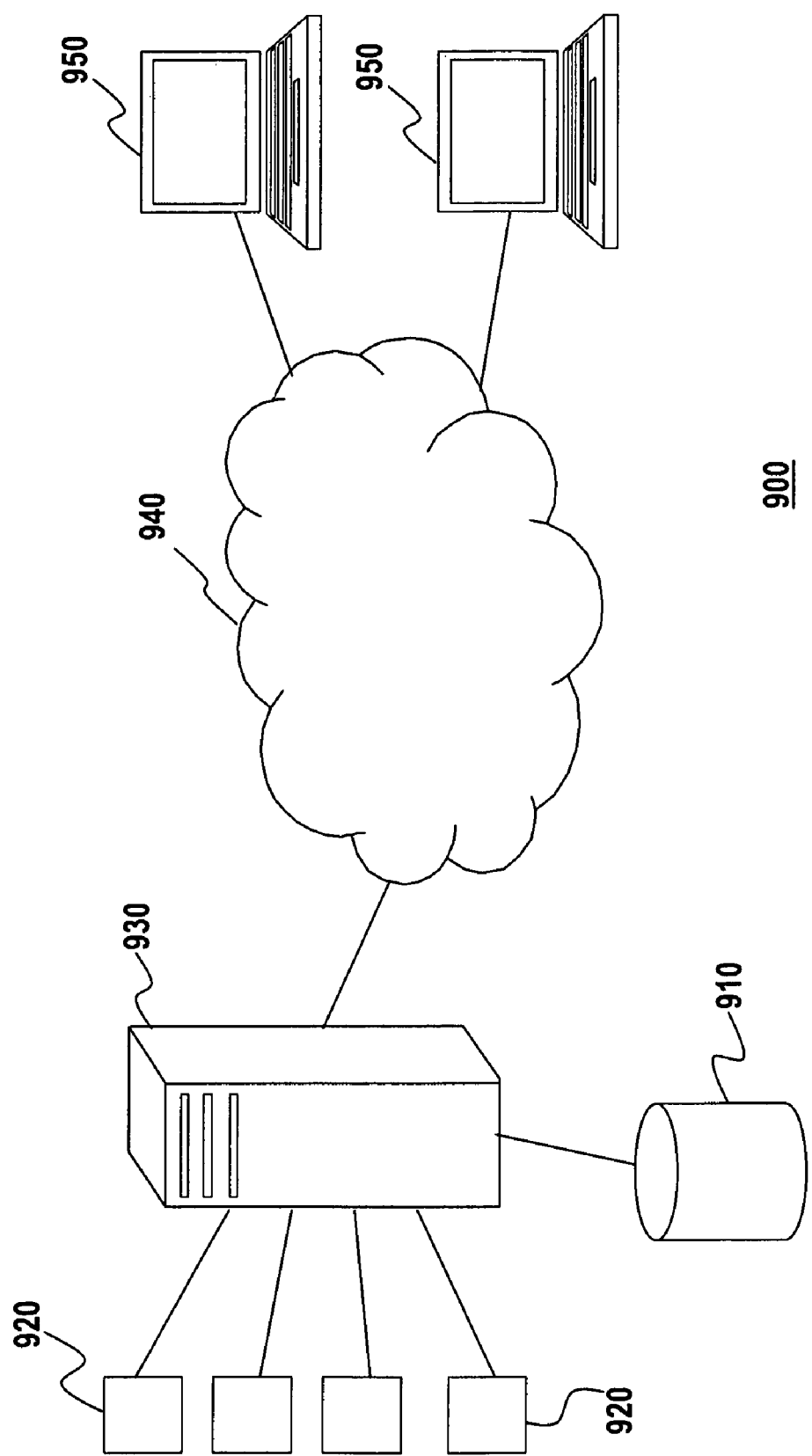
FIG. 9 is an exemplary system for carrying out the present invention.

With reference to FIG. 9, the invention can be applied over a system 900. It will be known to those skilled in the art that the system shown in FIG. 9 is exemplary only; systems with other configurations and/or having different components may be used to implement the present invention. A repository 910 maintains information identifying a plurality of assets 920 and relationships among the assets. A plurality of tools may be implemented by server 930. These tools monitor and/or manage assets that support applications; the applications themselves; and/or services that are supported by one or more applications. A processor within server 930 aggregates event and performance data collected by the tools. A portal 940 is maintained on an intranet or the Internet. A user 950 can access the aggregated event and performance data through the portal 940, thereby allowing the user to determine an impact of an event or a performance issue on the application or the service based on the aggregated event or performance data and the relationships among the assets.

The present invention is intended to embrace all alternatives, modifications and variances that fall within the scope of the appended claims.

What is claimed is:

1. A device, comprising:
 a user interface module through which a user accesses event and performance data collected by a plurality of tools performing at least one of monitoring and managing of at least one of (i) one or more assets that support an application, (ii) the application, and (iii) one or more services that are supported by one or more applications, and aggregated by a processor,
 the user interface module including a plurality of interfaces to allow the user to determine an impact of an event or a performance issue on the application or the service based on the aggregated event or performance data and relationships among the assets.

2. The device of claim 1, wherein the plurality of interfaces includes a console manager to display, in real time, the events that are occurring on the one or more assets.

3. The device of claim 2, wherein the console manager includes a hierarchy interface to list the application and its instances.

4. The device of claim 2, wherein the console manager includes a metric interface to identify infrastructure components on which the one or more assets depend.

5. The device of claim 4, wherein the metric interface includes a dependence tree object to provide a graphical representation of the infrastructure components and their relationships.

6. The device of claim 2, wherein the console manager includes a console monitor to provide detailed information of one or more events.

7. The device of claim 6, wherein the detailed information includes events occurring on the one or more assets, other assets affected, status of the one or more events, type of event, priority of event, date/time of event.

8. The device of claim 2, wherein the plurality of interfaces includes a tool configurator to configure a synthetic transaction to monitor performance of the one or more assets through one or more of the plurality of tools.

9. A computer program product including a computer readable medium having stored thereon computer executable instructions that, when executed on a computer, the computer performs a method comprising the steps of:
 (A) maintaining a repository comprising information identifying a plurality of assets and one or more relationships among the assets;
 (B) identifying one or more assets for supporting an application;
 (C) identifying one or more applications that are included in a service;
 (D) aggregating a set of event and performance data collected by a plurality of tools that perform at least one of monitoring and managing of at least one of (i) the identified assets, (ii) the application, and (iii) the service; and
 (E) providing to a user a portal to access the aggregated event and performance data, thereby allowing the user to determine an impact of an event or a performance issue on the application or the service based on the aggregated event or performance data and the relationships among the assets.

* * * * *